(12) United States Patent
Ozawa

(10) Patent No.: US 9,469,346 B2
(45) Date of Patent: Oct. 18, 2016

(54) VEHICLE BODY FRONT SECTION STRUCTURE

(71) Applicant: TOYOTA JIDOSHA KABUSHIKI KAISHA, Toyota-shi (JP)

(72) Inventor: Kohei Ozawa, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/827,542

(22) Filed: Aug. 17, 2015

(65) Prior Publication Data

US 2016/0052554 A1  Feb. 25, 2016

(30) Foreign Application Priority Data

Aug. 21, 2014  (JP) .................................. 2014-168772

(51) Int. Cl.
| | |
|---|---|
| B60J 7/00 | (2006.01) |
| B62D 21/15 | (2006.01) |
| B62D 25/04 | (2006.01) |
| B62D 25/08 | (2006.01) |

(52) U.S. Cl.
CPC ............. *B62D 21/152* (2013.01); *B62D 25/04* (2013.01); *B62D 25/082* (2013.01)

(58) Field of Classification Search
CPC .. B61D 7/00; H01M 10/0525; H01M 4/133; H01M 4/364; H01M 4/366; B29C 45/1704; B60R 2021/0006; H01L 21/67326; H01L 21/67383; A47B 2200/06
USPC .................................................... 296/187.09
See application file for complete search history.

(56) References Cited

U.S. PATENT DOCUMENTS

| | | | | |
|---|---|---|---|---|
| 5,011,201 A * | 4/1991 | Takahashi | ............ | B62D 25/088 296/203.02 |
| 5,201,566 A * | 4/1993 | Mori | ...................... | B62D 21/11 296/192 |
| 6,364,358 B1 * | 4/2002 | Miller | .................... | B62D 25/04 280/784 |
| 6,364,401 B1 * | 4/2002 | Kim | ....................... | B62D 25/04 296/187.03 |
| 7,059,667 B2 * | 6/2006 | Tomita | ............... | B62D 25/2018 296/203.03 |
| 8,075,047 B2 * | 12/2011 | Yamada | ................. | B62D 25/04 296/193.09 |
| 8,469,442 B1 * | 6/2013 | Pencak | .................. | B62D 25/14 296/187.12 |
| 8,991,907 B1 * | 3/2015 | Kim | ..................... | B62D 25/082 296/193.09 |
| 9,096,274 B2 * | 8/2015 | Kaneko | .................. | B62D 25/14 |

(Continued)

FOREIGN PATENT DOCUMENTS

| | | |
|---|---|---|
| JP | 09-207820 | 8/1997 |
| JP | 09-309461 | 12/1997 |

(Continued)

*Primary Examiner* — Kiran B Patel
(74) *Attorney, Agent, or Firm* — Oblon, McClelland, Maier & Neustadt, L.L.P

(57) ABSTRACT

A vehicle body front section structure. A front side member includes a side member front portion extending in a vehicle body front-rear direction at a side portion of a power unit chamber, and a side member rear portion that is contiguous to a rear end portion of the side member front portion, and that is formed with a kick portion extending toward a vehicle body rear lower side along a dash panel. An upper end portion on a vehicle body width direction inner side of a reinforcement member is fixed to a side wall portion on the vehicle body width direction outer side of the side member front portion, and a lower end portion on the vehicle body width direction inner side of the reinforcement member is fixed to a side wall portion on the vehicle body width direction outer side of the kick portion.

5 Claims, 3 Drawing Sheets

(56) References Cited

U.S. PATENT DOCUMENTS

| | | | | |
|---|---|---|---|---|
| 9,187,133 | B2* | 11/2015 | Rangaswamaiah | B62D 25/04 |
| 2002/0063445 | A1* | 5/2002 | Takeuchi | B62D 25/082 |
| | | | | 296/204 |
| 2003/0141712 | A1 | 7/2003 | Miyasaka | |
| 2003/0189358 | A1* | 10/2003 | Watanabe | B62D 25/081 |
| | | | | 296/203.02 |
| 2009/0146462 | A1* | 6/2009 | Sato | B62D 21/157 |
| | | | | 296/203.03 |
| 2012/0043785 | A1* | 2/2012 | Mildner | B62D 25/2045 |
| | | | | 296/193.02 |
| 2012/0187711 | A1* | 7/2012 | Yamagishi | B60T 7/06 |
| | | | | 296/72 |
| 2013/0334840 | A1* | 12/2013 | Iseki | B62D 21/11 |
| | | | | 296/193.09 |
| 2014/0001790 | A1 | 1/2014 | Zischke et al. | |
| 2015/0008703 | A1* | 1/2015 | Furusaki | B62D 21/152 |
| | | | | 296/187.08 |
| 2015/0145284 | A1* | 5/2015 | Nishida | B62D 25/2036 |
| | | | | 296/187.1 |
| 2015/0246697 | A1* | 9/2015 | Kishima | B62D 25/16 |
| | | | | 296/180.1 |
| 2016/0016612 | A1* | 1/2016 | Torikawa | B62D 25/025 |
| | | | | 280/784 |
| 2016/0059892 | A1* | 3/2016 | Lee | B62D 21/152 |
| | | | | 296/187.09 |

FOREIGN PATENT DOCUMENTS

| | | |
|---|---|---|
| JP | 2002-249079 | 9/2002 |
| JP | 2015-039946 | 3/2015 |
| JP | 2015-116979 | 6/2015 |
| WO | WO 2014/002890 A1 | 1/2014 |

\* cited by examiner

VEHICLE BODY FRONT SECTION STRUCTURE

CROSS-REFERENCE TO RELATED APPLICATION

This application is based on and claims priority under 35 USC 119 from Japanese Patent Application No. 2014-168772 filed on Aug. 21, 2014, which is incorporated by reference herein.

BACKGROUND

1. Technical Field

The present invention relates to a vehicle body front section structure.

2. Related Art

Japanese Patent Application Laid-Open (JP-A) No. 2002-249079 describes an invention relating to a vehicle body front section structure. Put briefly, a front energy absorption member is provided at a back face of a side end portion of a bumper, at a vehicle front side of a front wheel. A rear energy absorption member is provided at a recess portion formed by a front end face of a side sill and a front end face of an outrigger at a vehicle rear side of the front wheel. This thereby enables a concentration of load at a front end portion of the side sill to be suppressed even when load is input to the front wheel in a vehicle front end collision.

However, in JP-A No. 2002-249079, configuration is made in anticipation of cases in which load is input to the front wheel in a vehicle front end collision, therefore leaving room for improvement with regards to suppressing load that acts on a dash panel when load is input to a front side member in a vehicle front end collision.

In consideration of the above circumstances, an object of the present invention is to obtain a vehicle body front section structure capable of suppressing load acting on a dash panel when load is input to a front side member in a vehicle front end collision.

SUMMARY

A vehicle body front section structure of a first aspect includes: a dash panel dividing between a power unit chamber and a cabin positioned at a vehicle rear side of the power unit chamber; a front side member including a location extending in a vehicle body front-rear direction at a side portion of the power unit chamber; a front pillar that is positioned further to a vehicle body width direction outside than the front side member at a front end of a side section of the cabin, that extends in a vehicle body up-down direction, and to which a vehicle body width direction outside end portion of the dash panel is joined; and a reinforcement member that is provided following a front face of a side portion on the vehicle body width direction outside of the dash panel, and that spans between a side wall portion on the vehicle body width direction outside of the front side member and a front wall portion at a vehicle body front side of the front pillar. The front side member includes a side member front portion extending in the vehicle body front-rear direction at the side portion of the power unit chamber, and a side member rear portion that is contiguous to a rear end portion of the side member front portion, and that is formed with a kick portion extending toward a vehicle body rear lower side following the dash panel; and an upper end portion on the vehicle body width direction inside of the reinforcement member is fixed to a side wall portion on the vehicle body width direction outside of the side member front portion, and a lower end portion on the vehicle body width direction inside of the reinforcement member is fixed to a side wall portion on the vehicle body width direction outside of the kick portion.

According to the above configuration, the reinforcement member is provided following the front face of the side portion on the vehicle body width direction outside of the dash panel, and the reinforcement member spans between the side wall on the vehicle body width direction outside of the front side member and the front wall portion at the vehicle body front side of the front pillar. Accordingly, when load is input to the front side member in a vehicle front end collision, a portion of the load is transmitted to the front pillar through the reinforcement member. Load acting on the dash panel is accordingly suppressed, even when the front side member is squashed and deformed by load in a collision.

According to the above configuration, the reinforcement member can be set with a long length in the vehicle body up-down direction, thereby increasing the bending rigidity of the reinforcement member with respect to load from the front side member side. This thereby enables efficient transmission of load from the front side member toward the front pillar when load is input to the front side member in a vehicle front end collision.

A vehicle body front section structure of a second aspect is the first aspect, further includes: a rocker that is a framework member with a closed cross-section structure extending in the vehicle body front-rear direction at a lower end portion of a side section of the vehicle body. An end portion on the vehicle body width direction outer side of the reinforcement member is fastened to a front side end portion of the rocker and to the front pillar.

A vehicle body front section structure of a third aspect is the first aspect, wherein the reinforcement member is formed with a bead extending along the vehicle body width direction as viewed from in front of the vehicle.

According to the above configuration, the reinforcement member is formed with the bead extending along the vehicle body width direction as viewed from in front of the vehicle. The reinforcement member accordingly has higher bending rigidity with respect to load from the front side member side than in a configuration in which the bead is not formed. The efficiency with which load is transmitted from the front side member, through the reinforcement member and to the front pillar when load is input to the front side member in a vehicle front end collision is accordingly improved.

A vehicle body front section structure of a fourth aspect is the configuration of the third aspect, wherein the bead is set in a range including a location facing a vehicle body front side of a join portion between the dash panel and the front pillar.

According to the above configuration, the reinforcement can be prevented or suppressed from buckling at the vehicle body front side of the join portion between the dash panel and front pillar during a vehicle front end collision. This thereby enables contact between a buckled portion of the reinforcement member and the join portion between the dash panel and the front pillar to be prevented or suppressed.

A vehicle body front section structure of a fifth aspect includes: a dash panel dividing a power unit chamber from a cabin positioned at a vehicle rear side of the power unit chamber; a front side member, including a portion extending in a vehicle body front-rear direction, at a side portion of the power unit chamber; a front pillar that is positioned further to a vehicle body width direction outer side than the front side member at a front end of a side section of the cabin, that extends in a vehicle body up-down direction, and that is joined to a vehicle body width direction outer side end portion of the dash panel; and a reinforcement member that is provided along a front face of a side portion on the vehicle body width direction outer side of the dash panel, and that spans between a side wall portion on the vehicle body width direction outer side of the front side member and a front wall portion at a vehicle body front side of the front pillar. The front side member includes a side member front portion extending in the vehicle body front-rear direction at the side portion of the power unit chamber, and a side member rear portion that is contiguous to a rear end portion of the side member front portion, and that is formed with a kick portion extending toward a vehicle body rear lower side along the dash panel; and both an upper end portion and a lower end portion on a vehicle body width direction inner side of the reinforcement member are fixed to an outer wall portion on the vehicle body width direction outer side of the side member front portion.

DESCRIPTION OF EMBODIMENTS

Figure 1:
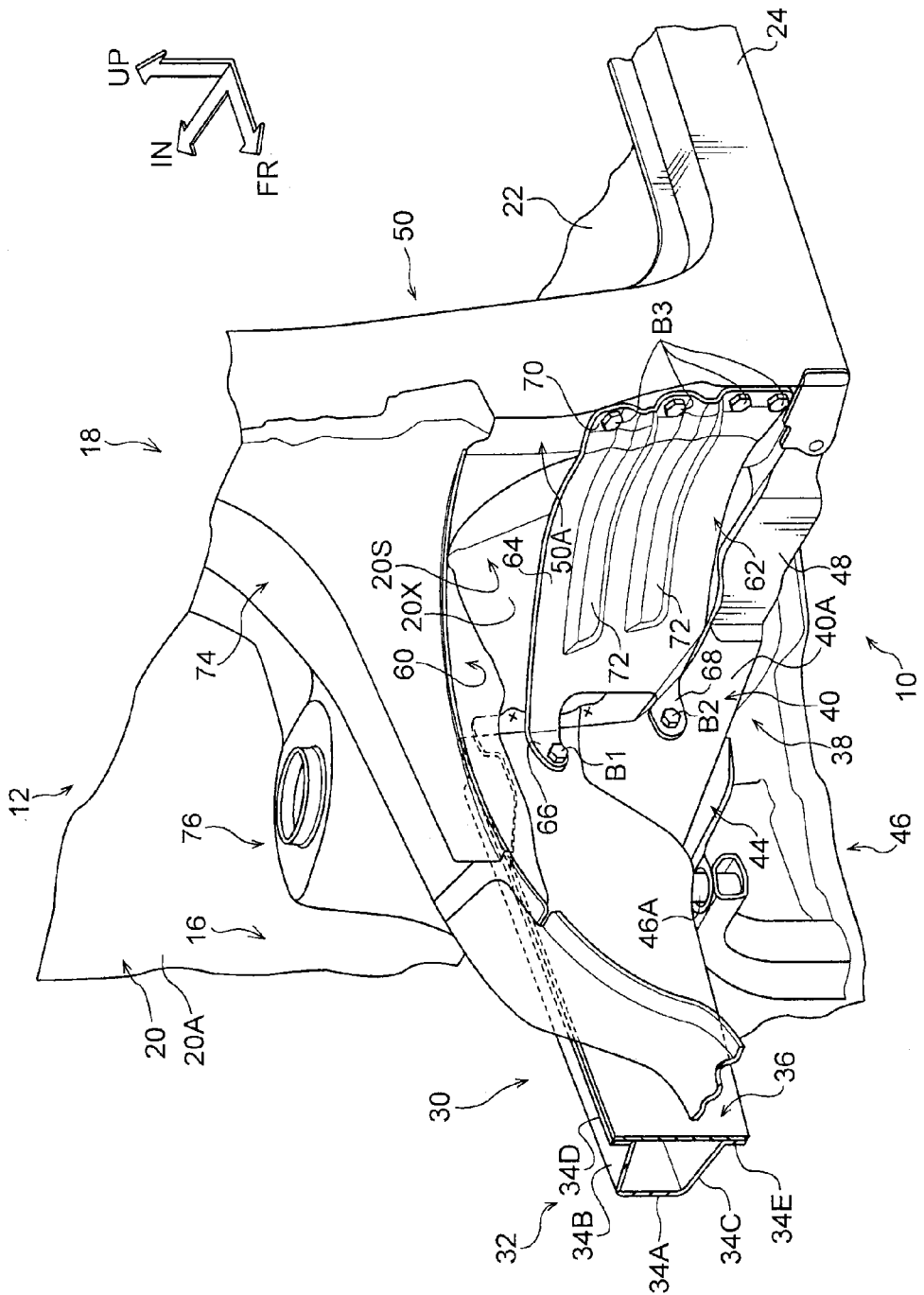
FIG. 1 is a perspective view illustrating part of a vehicle body front section structure according to an exemplary embodiment of the present invention.
Figure 2:
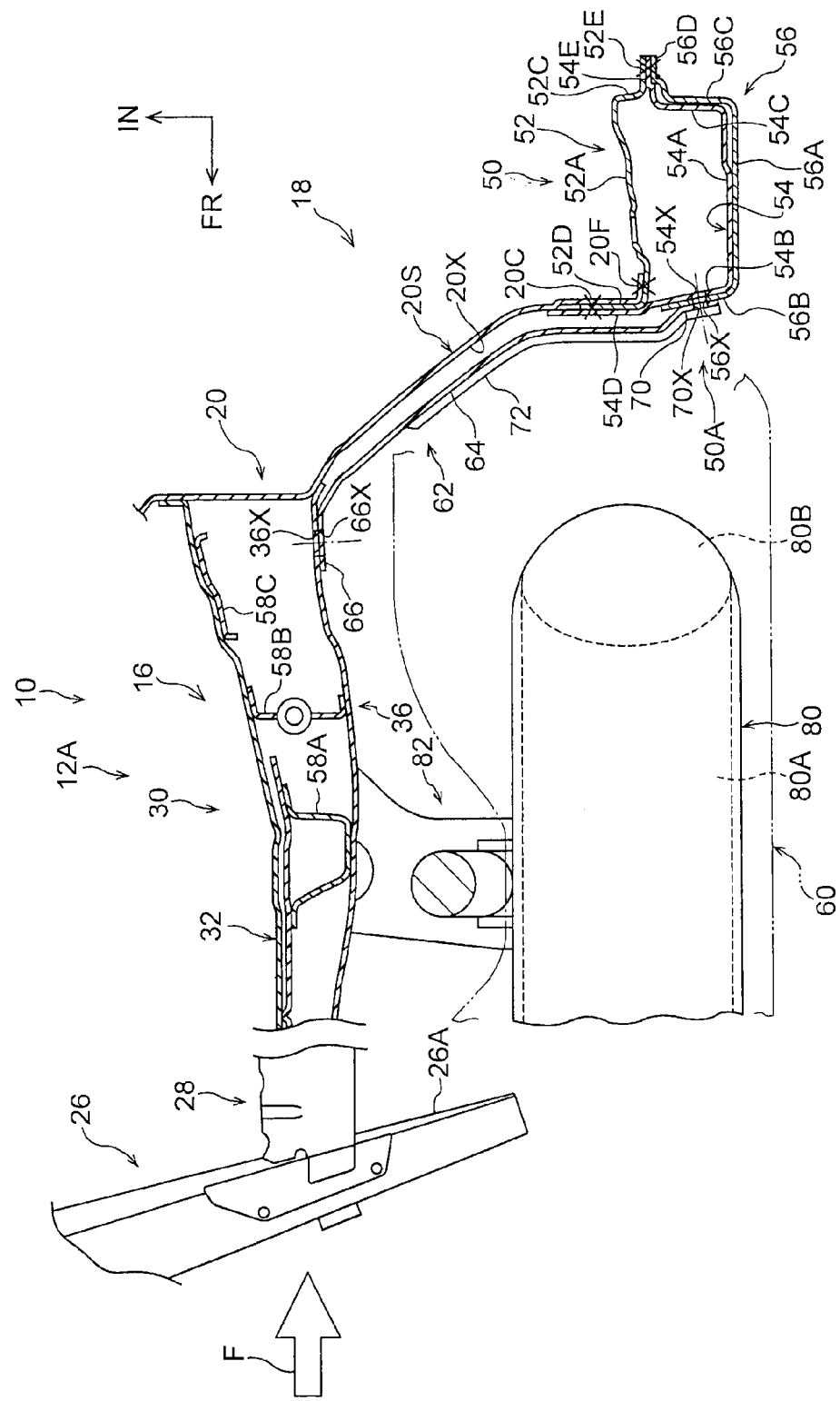
FIG. 2 is a plan view illustrating part of a vehicle body front section structure according to an exemplary embodiment of the present invention, in which, with the exception of a front wheel, the right side of the cutaway lines in the drawing is shown in horizontal cross-section.
Figure 3:
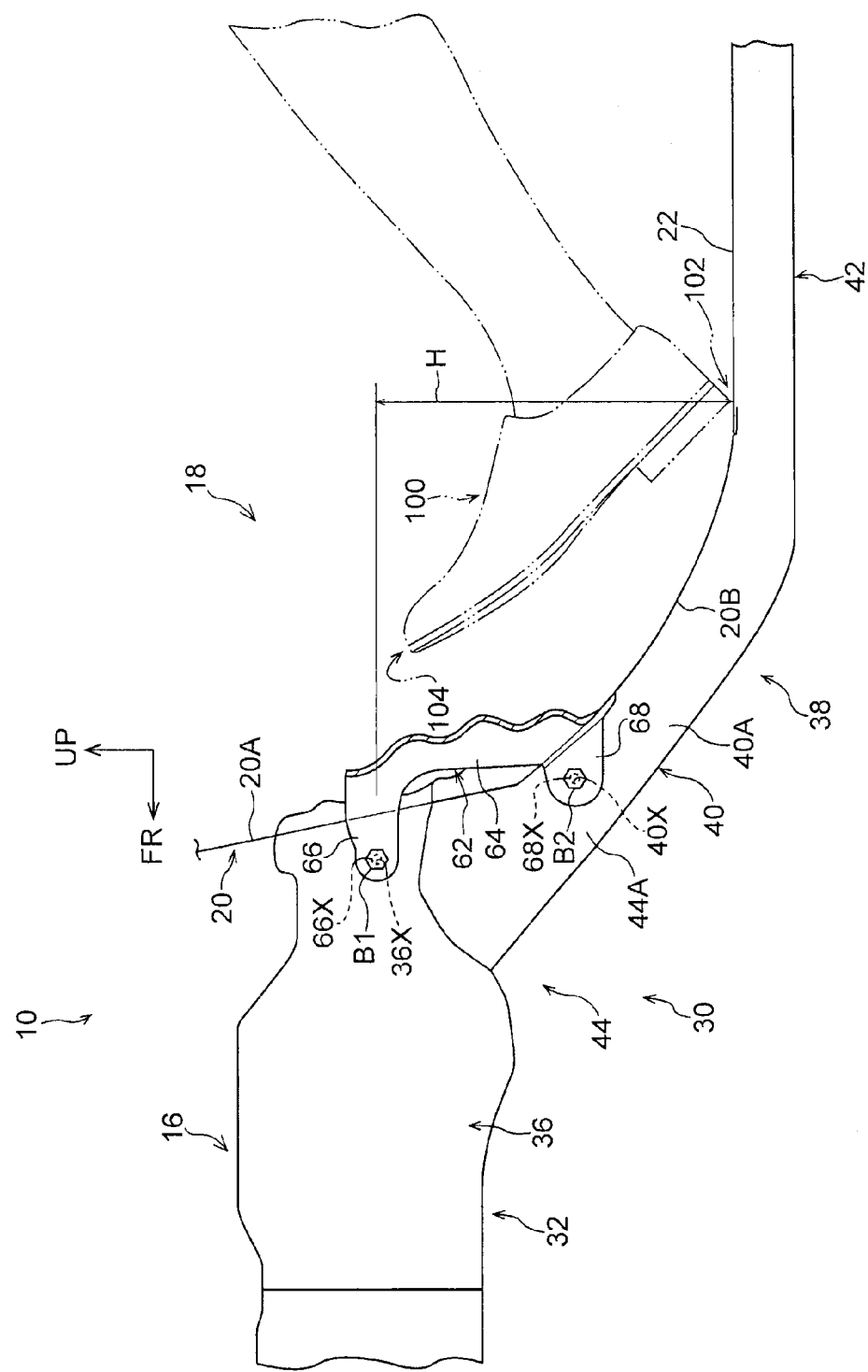
FIG. 3 is a simplified side view illustrating part of the vehicle body front section structure illustrated in FIG. 1.

Explanation follows regarding a vehicle body front section structure according to an exemplary embodiment of the present invention, with reference to FIG. 1 to FIG. 3. In the drawings, the arrow FR indicates the vehicle body front side, the arrow UP indicates the vehicle body upper side, and the arrow IN indicates the vehicle body inside, as appropriate. Unless stated otherwise, reference in the following explanation simply to the front-rear, up-down, and left-right directions refers to the front and rear in the vehicle body front-rear direction, up and down in the vehicle body up-down direction, and left and right when facing in the direction of travel.

Exemplary Embodiment Configuration

FIG. 1 is a perspective view illustrating part of a left side of the vehicle body of a car (vehicle) 12 applied with a vehicle body front section structure 10, in a state viewed from a diagonally upper side of the side of the vehicle body. FIG. 2 is a plan view illustrating part of the vehicle body front section structure 10, in which, with the exception of a front wheel 80, the right side of the cutaway lines in the drawing is shown in horizontal cross-section. The vehicle body front section structure 10 is configured with basic left-right symmetry.

As illustrated in FIG. 1, a dash panel (vehicle body cabin front wall) 20 divides the car 12 into a power unit chamber 16, and a cabin (vehicle compartment) 18 positioned to the vehicle rear side of the power unit chamber 16. An upright plate section 20A, formed in a substantially vertical plate shape, is provided at an upper portion of the dash panel 20. As illustrated in the simplified side view of part of the vehicle body front section structure 10 in FIG. 3, a lower portion of the dash panel 20 is provided with a toe board section 20B that is formed in an inclined plate shape, provided integrally to the upright plate section 20A. The toe board section 20B is inclined toward the vehicle body rear side on progression toward the vehicle body lower side.

As illustrated in FIG. 1, a side portion 20S on the vehicle body width direction outside of the dash panel 20 has a shape bulging toward the inside of the cabin 18, and configures a rear portion of a wheel housing section 60. The wheel housing section 60 is a location covering the front wheel 80 (see FIG. 2). The front wheel 80 illustrated in FIG. 2 includes a wheel 80A with a circular disk portion orthogonal to its axis of rotation, and a tire 80B that is retained on an outer circumferential portion of the wheel 80A. The front wheel 80 is coupled together with a vehicle front section 12A through suspension 82. The suspension 82 is a device to absorb vibration travelling from the front wheel 80 toward the vehicle front section 12A.

As illustrated in FIG. 3, a front end portion of a floor panel (vehicle body floor) 22 is integrally joined to a lower end portion of the toe board section 20B by welding or the like. Namely, the floor panel 22 extends contiguously toward the vehicle body rear side from the lower end portion of the dash panel 20. The floor panel 22 configures a floor face of the cabin 18. A rocker (also known as a "side sill") 24 is joined to a vehicle body width direction outside end portion of the floor panel 22 illustrated in FIG. 1. The rocker 24 serves as a framework member with a closed cross-section structure extending in the vehicle body front-rear direction at a lower end portion of a side section of the vehicle body, and is disposed in a range including a lower edge side of a side door opening.

The power unit chamber 16, formed further to the vehicle body front side than the cabin 18, houses a power unit. As an example, in the present exemplary embodiment the power unit is configured including an engine and a motor. Namely, the car 12 is a hybrid car with two drive sources. The power unit chamber 16 may be understood to be an engine compartment.

A pair of left and right front side members 30 are provided on both vehicle body width direction sides of a lower portion of the power unit chamber 16. The front side members 30 will be explained later. Bumper reinforcement 26 is fixed to front end portions of the front side members 30 through respective crash boxes 28, illustrated to the left side of the cutaway lines in FIG. 2.

In the vehicle front section 12A, the bumper reinforcement 26 is disposed with its length direction along the vehicle body width direction, and includes bumper extension portions 26A extending further toward the vehicle body width direction outsides than the front side members 30. An absorber, such as a foamed body, is attached to a front end face of the bumper reinforcement 26. A bumper cover covers the absorber and the bumper reinforcement 26 to configure a front bumper.

As illustrated in FIG. 1, each front side member 30 includes a side member front portion 32 extending in the vehicle body front-rear direction at a side portion of the power unit chamber 16. The side member front portion 32 is set at a height position slightly to the vehicle body upper side of the axis of rotation of the front wheel 80 (see FIG. 2). As illustrated in FIG. 2, the side member front portion 32 is provided further to the vehicle body width direction inside than the wheel housing section 60. As illustrated in FIG. 1, the side member front portion 32 is formed with a closed cross-section portion extending in the vehicle body front-rear direction by a side member inner portion 34 disposed on the vehicle body width direction inside, and a side member outer portion 36 disposed on the vehicle body width direction outside. The pair of left and right side member front portions 32 support the power unit through engine mounts. Note that as illustrated in FIG. 2, reinforcement members 58A, 58B, 58C are disposed inside the closed cross-section portion of the side member front portion 32.

As illustrated in FIG. 1, as taken along the vehicle body width direction, the side member inner portion 34 is formed with a hat shaped cross-section profile, opening toward the vehicle body width direction outside. The side member inner portion 34 includes an inner side wall portion 34A configuring a side face on the vehicle body width direction inside of the side member front portion 32, an inner upper wall portion 34B configuring an upper face of the side member front portion 32, and an inner lower wall portion 34C configuring a lower face of the side member front portion 32. An upright wall shaped upper flange 34D projects out toward the vehicle body upper side from a vehicle body width direction outside end portion of the inner upper wall portion 34B. An upright wall shaped lower flange 34E projects out toward the vehicle body lower side from a vehicle body width direction outside end portion of the inner lower wall portion 34C.

The side member outer portion 36 is formed in an upright wall shape, closes off the open side of the side member inner portion 34, and configures a side wall portion on the vehicle width direction outside of the front side member 30. An upper end portion of the side member outer portion 36 is overlaid with and joined to the upper flange 34D of the side member inner portion 34 by welding, and a lower end portion of the side member outer portion 36 is overlaid with and joined to the lower flange 34E of the side member inner portion 34 by welding. A bolt insertion hole 36X (see FIG. 2) is formed penetrating a rear end portion of the side member outer portion 36 (a base portion of the side member front portion 32).

Each front side member 30 includes a side member rear portion 38, configured further to the vehicle body rear side than the side member front portion 32. The side member rear portion 38 is formed with a kick portion 40 that is contiguous to the rear end portion of the side member front portion 32 and extends toward the vehicle lower rear side along the toe board section 20B (see FIG. 3) of the dash panel 20. The kick portion 40 illustrated in FIG. 3 is disposed at a lower side of the toe board section 20B, and, as taken along a plane orthogonal to the length direction of the kick portion 40, is formed with a hat shaped cross-section profile opening toward the toe board section 20B side. Flanges on both sides of the kick portion 40 are overlaid with and joined by welding to the toe board section 20B.

A bolt insertion hole 40X is formed in a side wall portion 40A on the vehicle body width direction outside of the kick portion 40 (more broadly speaking, a side wall portion on the vehicle body width direction outside of the front side member 30). The bolt insertion hole 40X of the kick portion 40 is set at a diagonal lower rear side of the bolt insertion hole 36X of the side member outer portion 36.

The side member rear portion 38 also includes an underfloor portion (rear member portion) 42 that is contiguous to a rear end portion of the kick portion 40 and extends toward the vehicle body rear side at a lower side of the floor panel 22. As taken along the vehicle body width direction, the underfloor portion 42 is formed with a hat shaped cross-section profile opening toward the floor panel 22 side. Flanges on both sides of the underfloor portion 42 are overlaid with and joined by welding to the floor panel 22.

A bent portion 44 formed between a rear end portion of the side member front portion 32 and an upper portion of the kick portion 40 includes a widened portion 44A. The widened portion 44A is set with a longer width in the vehicle body up-down direction than locations of the front side member 30 further to the vehicle body front side than the bent portion 44.

Both vehicle body width direction sides of a suspension member 46, illustrated in FIG. 1, are supported suspended from the pair of left and right front side members 30. Front side attachment portions 46A are provided to the suspension member 46 at the front side of both vehicle body width direction sides. The front side attachment portions 46A are attached to rear end portions of the inner lower wall portions 34C of the side member front portions 32. Rear side attachment portions are moreover provided to the suspension member 46 at the rear side of both vehicle body width direction sides. The rear side attachment portions are attached to a front end portion of a lower wall portion of the underfloor portion 42 (see FIG. 3). The suspension member 46 attached to the front side members 30 supports the left and right suspension 82 (see FIG. 2).

A torque box 48 is joined by welding to a lower end portion of a vehicle body width direction outside portion of the dash panel 20. The torque box 48 is interposed between the side member rear portion 38 and the rocker 24.

A front pillar 50 extends in the vehicle body up-down direction contiguously to a front end portion of the rocker 24. The front pillar 50 is provided at a front end of the side section of the cabin 18 and forms a front edge portion of a front side door opening, and is positioned further to the vehicle body width direction outside than the front side member 30. A vehicle body up-down direction intermediate portion of the front pillar 50 is joined to a rear end portion of an apron upper member 74, and a suspension tower 76 is provided at the vehicle body width direction inside of the apron upper member 74. The wheel housing section 60 is contiguous to a lower portion of the suspension tower 76.

As illustrated in FIG. 2, the front pillar 50 is configured including a pillar inner panel 52 disposed on the cabin 18 side (inside the vehicle compartment), and a pillar outer panel 54 disposed on the opposite side to the cabin 18 side (outside the vehicle compartment). The front pillar 50 is formed in a hollow columnar shape from the pillar inner panel 52 and the pillar outer panel 54.

The pillar inner panel 52 includes an inner wall portion 52A that configures a vehicle body width direction inside wall portion of the front pillar 50, with its front and back faces facing along the vehicle body width direction, and a rear side upright wall portion 52C that is bent to extend from a rear end of the inner wall portion 52A toward the vehicle body width direction outside. The pillar inner panel 52 also includes a front end flange 52D bent so as to extend from a vehicle body front-rear direction front end of the inner wall portion 52A toward the vehicle body width direction outside, and a rear end flange 52E bent so as to extend from a vehicle body width direction outside end portion of the rear side upright wall portion 52C toward the vehicle body rear side.

A vehicle body width direction outside end portion 20C of the dash panel 20 is overlaid with and joined by welding to the front end flange 52D of the pillar inner panel 52 from the vehicle body rear side (the weld point is indicated by an X). A side flange 20F, bent toward the vehicle body rear side, extends from a vehicle body width direction outside end of the dash panel 20. The side flange 20F is overlaid with and joined by welding to a vehicle body front side end portion of the inner wall portion 52A of the pillar inner panel 52 from the vehicle body width direction inside (the weld point is indicated by an X).

The pillar outer panel 54 includes an outer wall portion 54A configuring a wall portion on the vehicle body width direction outside of the front pillar 50, with its front and back faces facing along the vehicle body width direction, a front side upright wall portion 54B bent so as to extend from a front end of the outer wall portion 54A toward the vehicle body width direction inside, and a rear side upright wall portion 54C bent so as to extend from a rear end of the outer wall portion 54A toward the vehicle body width direction inside. Bolt insertion holes 54X are formed penetrating a location on the vehicle body width direction outside of the front side upright wall portion 54B. Plural (four in the present exemplary embodiment) of the bolt insertion holes 54X are provided in a row along the vehicle body up-down direction, at a lower portion of the front side upright wall portion 54B.

The pillar outer panel 54 includes a front end flange 54D that is overlaid with the front end flange 52D of the pillar inner panel 52 from the vehicle body front side. The front end flange 54D is a location extending from a vehicle body width direction inside end portion of the front side upright wall portion 54B toward the vehicle body width direction inside, and is overlaid with the vehicle body width direction outside end portion 20C of the dash panel 20 and the front end flange 52D of the pillar inner panel 52, to form three layers which are joined together by welding (the weld point is indicated by an X). The pillar outer panel 54 further includes a rear end flange 54E that is overlaid with and joined by welding to the rear end flange 52E of the pillar inner panel 52 at the vehicle body width direction inside (the weld point is indicated by an X). The rear end flange 54E is a location bent so as to extend from a vehicle body width direction inside end portion of the rear side upright wall portion 54C toward the vehicle body rear side.

A side outer panel (also referred to as a side member outer panel) 56, configuring a vehicle body outer plate, is disposed on the opposite side of the pillar outer panel 54 to the cabin 18 side (on the vehicle compartment outside). The side outer panel 56 includes an outer wall portion 56A disposed on the vehicle body width direction outside of the outer wall portion 54A of the pillar outer panel 54, a front side upright wall portion 56B bent so as to extend from a front end of the outer wall portion 56A toward the vehicle body width direction inside, and a rear side upright wall portion 56C bent so as to extend from a rear end of the outer wall portion 56A toward the vehicle body width direction inside. The front side upright wall portion 56B of the side outer panel 56 is disposed at the vehicle body front side of the front side upright wall portion 54B of the pillar outer panel 54, and the rear side upright wall portion 56C of the side outer panel 56 is disposed at the vehicle body rear side of the rear side upright wall portion 54C of the pillar outer panel 54. Bolt insertion holes 56X are formed penetrating the front side upright wall portion 56B of the side outer panel 56 at positions facing the bolt insertion holes 54X of the front side upright wall portion 54B of the pillar outer panel 54. The front side upright wall portion 54B of the pillar outer panel 54 and the front side upright wall portion 56B of the side outer panel 56 are fastened together using bolts B3 (see FIG. 1) (a bolt fastening line is illustrated by the single-dotted intermittent line in FIG. 2), thereby configuring a front wall portion 50A at the vehicle body front side of the front pillar 50.

The side outer panel 56 further includes a flange 56D that is overlaid with the rear end flange 54E of the pillar outer panel 54 from the vehicle body width direction outside. The flange 56D is a location extending from a vehicle body width direction inside end portion of the rear side upright wall portion 56C toward the vehicle body rear side, and is overlaid with the rear end flange 52E of the pillar inner panel 52 and the rear end flange 54E of the pillar outer panel 54 to form three layers, which are joined together by welding (the weld point is indicated by an X).

As illustrated in FIG. 1, a reinforcement member (brace) 62, configured by a plate shaped metal member, spans between the front wall portion 50A of the front pillar 50 and a side wall portion (the side member outer portion 36 of the side member front portion 32 and the side wall portion 40A of the kick portion 40) on the vehicle body width direction outside of the front side member 30. The reinforcement member 62 may also be configured from fiber reinforced plastic or the like. The reinforcement member 62 is an element that may also be a coupling member. As illustrated in FIG. 2, the reinforcement member 62 is provided following a front face 20X (vehicle body front side face) of the side portion 20S on the vehicle body width direction outside of the dash panel 20. A specific gap (space) can be secured at the vehicle rear side of the front wheel 80 due to the reinforcement member 62 being provided following the front face 20X of the side portion 20S of the dash panel 20, even when the reinforcement member 62 is disposed in a state in which the front wheel 80 and the dash panel 20 are provided in their existing positions. A height position of the reinforcement member 62 is set so as to overlap with the height position of an up-down direction intermediate portion of the front wheel 80.

As illustrated in FIG. 1, the reinforcement member 62 includes a main body 64 disposed substantially following the side portion 20S of the dash panel 20. The main body 64 of the reinforcement member 62 is disposed so as to cover the side portion 20S of the dash panel 20, and the join portions between the dash panel 20 and the front pillar 50. An upper flange 66 extends from an upper end portion on the vehicle body width direction inside of the main body 64 of the reinforcement member 62 toward the vehicle body front side. As illustrated in FIG. 2, a bolt hole 66X is formed penetrating the upper flange 66 at a position facing the bolt insertion hole 36X of the side member outer portion 36. The upper flange 66 is fastened and fixed to the side member outer portion 36 of the side member front portion 32 by a bolt B1 (see FIG. 1) (a bolt fastening line is illustrated by a single-dotted intermittent line in FIG. 2).

As illustrated in FIG. 3, the height position of the fastening portion between the upper flange 66 and the side member outer portion 36 is set at a position at a height of 250 mm or more from the position of the floor panel 22 on which the heel 102 is placed when an occupant places their foot 100 on a footrest (the height H in FIG. 3 is 250 mm or more). Namely, the height position of the fastening portion between the upper flange 66 and the side member outer portion 36 is set at a position that is basically higher than the toes 104 of the foot 100 of the occupant when placed on the footrest.

A lower flange 68 extends toward the vehicle body front side from a lower end portion on the vehicle body width direction inside of the main body 64 of the reinforcement member 62. A bolt insertion hole 68X is formed penetrating the lower flange 68 at a position facing the bolt insertion hole 40X of the kick portion 40. The lower flange 68 is fastened and fixed to the side wall portion 40A of the kick portion 40 by a bolt B2. The fixing position of the lower flange 68 by the bolt B2 is accordingly set further toward the vehicle body rear side than the fixing position of the upper flange 66 by the bolt B1.

As illustrated in FIG. 1, a flange 70 extends from an end portion on the vehicle body width direction outside of the main body 64 of the reinforcement member 62 toward the vehicle body width direction outside. As illustrated in FIG. 2, bolt insertion holes 70X are formed penetrating the flange 70 at positions facing the bolt insertion holes 54X, 56X of the front wall portion 50A of the front pillar 50. The flange 70 of the reinforcement member 62 is fastened and fixed to the front wall portion 50A of the front pillar 50 by bolts B3 (see FIG. 1) (a bolt fastening line is illustrated by a single-dotted intermittent line in FIG. 2).

As illustrated in FIG. 1, the reinforcement member 62 is formed with beads 72 that extend along the vehicle body width direction as viewed from the front of the vehicle. Each bead 72 projects out toward the vehicle body front side, and extends from a location on the vehicle body width direction inside of the main body 64 to a vehicle body width direction outside end of the flange 70. Namely, as illustrated in FIG. 2, the beads 72 are set within a range including a location facing the vehicle body front side of the join portions (see the weld portions X) between a vehicle body width direction outside end portion of the dash panel 20 (the end portion 20C and the side flange 20F) and the front pillar 50. As illustrated in FIG. 1, plural of the beads 72 (two in the present exemplary embodiment) are set from top to bottom.

Operation and Advantageous Effects of the Present Exemplary Embodiment

Next, explanation follows regarding operation and advantageous effects of the present exemplary embodiment.

In the present exemplary embodiment, the reinforcement member 62 is provided following the front face 20X of the side portion 20S of the dash panel 20, and the reinforcement member 62 spans between the side wall portion on the vehicle body width direction outside of the front side member 30 (the side member outer portion 36 of the side member front portion 32, and the side wall portion 40A of the kick portion 40) and the front wall portion 50A of the front pillar 50. Accordingly, when a load F is input to the front side member 30 through the bumper reinforcement 26 and the crash box 28 in a vehicle front end collision, as illustrated in FIG. 2, a portion of the load F is transmitted to the front pillar 50 through the reinforcement member 62. Load acting on the dash panel 20 can accordingly be suppressed, even when, for example, the front side member 30 is squashed by load during a collision, and deforms into a Z shape in plan view.

In the present exemplary embodiment, as illustrated in FIG. 1, the beads 72 are formed to the reinforcement member 62 so as to extend along the vehicle body width direction as viewed from in front of the vehicle. The reinforcement member 62 accordingly has higher bending rigidity with respect to load from the front side member 30 side than in a configuration in which such beads are not formed. The efficiency with which load is transmitted from the front side member 30, through the reinforcement member 62 and to the front pillar 50 is accordingly improved when the load F is input to the front side members 30 during a vehicle front end collision, as illustrated in FIG. 2.

In the present exemplary embodiment, the beads 72 are set in the range including a location facing the vehicle body front side of the join portions (see the weld portions X) between the vehicle body width direction outside end portion of the dash panel 20 (the end portion 20C and the side flange 20F) and the front pillar 50. This thereby enables buckling of the reinforcement member 62 at the vehicle body front side of the join portions between the vehicle body width direction outside end portion of the dash panel 20 and the front pillar 50 to be prevented or suppressed during a vehicle front end collision. A buckled portion of the reinforcement member 62 can accordingly be prevented or suppressed from contacting the join portions between the dash panel 20 and the front pillar 50.

As illustrated in FIG. 1, in the present exemplary embodiment, the upper flange 66 at the upper end portion on the vehicle body width direction inside of the reinforcement member 62 is fixed to the side member outer portion 36 of the side member front portion 32, and the lower flange 68 at the lower end portion on the vehicle body width direction inside of the reinforcement member 62 is fixed to the side wall portion 40A on the vehicle body width direction outside of the kick portion 40. The reinforcement member 62 can accordingly be set with a long length in the vehicle body up-down direction, thereby increasing the bending rigidity of the reinforcement member 62 with respect to load from the front side member 30 side. This thereby enables efficient transmission of load from the front side member 30 toward the front pillar 50 when load is input to the front side member 30 in a vehicle front end collision.

As described above, the vehicle body front section structure 10 according to the present exemplary embodiment enables load acting on the dash panel 20 to be suppressed when load is input to the front side member 30 in a vehicle front end collision.

In a small overlap collision or an oblique collision, in which the vehicle is involved in a front end collision at the vehicle body width direction outside of the front side member 30 illustrated in FIG. 2, it is conceivable that the front wheel 80 could undergo oblique displacement toward the vehicle body width direction inside and rear side (namely, the side of the side portion 20S of the dash panel 20) while still rotating. However, in the present exemplary embodiment, the reinforcement member 62 is provided following the front face 20X of the side portion 20S, thereby enabling the front wheel 80 to be caught by the reinforcement member 62, and thus enabling the received load to be transmitted to the front pillar 50. This thereby enables acting on the side portion 20S of the front side member 30 to be suppressed, even when the front wheel 80 is shunted backward. Similarly, when the front wheel 80 is shunted backward toward the side of the join portions between the front pillar 50 and the dash panel 20, it can be caught by the reinforcement member 62, thereby enabling load acting on the join portions between the front pillar 50 and the dash panel 20 to be suppressed. Collision energy is accordingly absorbed by deformation of the reinforcement member 62 that catches the front wheel 80.

Due to forming the beads 72 to the reinforcement member 62, collision energy can be effectively absorbed when the front wheel 80 impacts the reinforcement member 62 in a small overlap collision or an oblique collision, since energy absorption is secured by the beads 72.

In the present exemplary embodiment, the reinforcement member 62 illustrated in FIG. 1 is set with a long length in the vehicle body up-down direction as described above, and the fixing position of the lower flange 68 by the bolt B2 is set further to the vehicle body rear side than the fixing position of the upper flange 66 by the bolt B1, such that the reinforcement member 62 can be tilted slightly toward the front. A separation between the front wheel 80 (see FIG. 2) and the reinforcement member 62 can accordingly be made almost uniform from top to bottom, enabling the reinforcement member 62 to catch the front wheel 80 effectively when the front wheel 80 illustrated in FIG. 2 is shunted backward.

Supplementary Explanation to the Exemplary Embodiment

In the exemplary embodiment described above, the power unit disposed in the power unit chamber 16 illustrated in FIG. 1 is configured including an engine and a motor as an example. However, the power unit disposed in the power unit chamber may, for example, be a power unit of a different configuration, such as a configuration including an engine but not a motor, as in an engine-driven vehicle, or a configuration including a motor but not an engine, as in an electric vehicle.

In the exemplary embodiment described above, explanation has been given regarding a case in which the vehicle body front section structure 10 is configured with basic left-right symmetry, and reinforcement members 62 are provided on both the left and right sides of the vehicle body. However, configuration may be made in which a reinforcement member (62) is only provided on the left side of the vehicle body, or in which a reinforcement member (62) is only provided on the right side of the vehicle body. Moreover, as another modified example, plural reinforcement members may be provided spanning between a side wall portion on the vehicle body width direction outside of a front side member, and a front wall portion on the vehicle body front side of a front pillar.

In the above exemplary embodiment, the reinforcement member 62 is formed with the beads 72; however the reinforcement member may be configured by a reinforcement member that is not formed with such beading. In the above exemplary embodiment, the beads 72 are set in the range including a location facing the vehicle body front side of the join portions between the dash panel 20 and the front pillar 50; however configuration may be made in which beads are set in a range that does not include a location facing the vehicle body front side of the join portions between a dash panel and a front pillar.

In the above exemplary embodiment, the upper flange 66 of the reinforcement member 62 is fixed to the side member front portion 32, and the lower flange 68 is fixed to the kick portion 40; however the reinforcement member may, for example, be a reinforcement member fixed to a side wall portion on the vehicle body width direction outside of a side member front portion at both an upper end portion or a lower end portion on the vehicle body width direction inside of the reinforcement member.

"Provided following a front face of a side portion on the vehicle body width direction outside of the dash panel" encompasses configurations in which, as in the above exemplary embodiment, the reinforcement member 62 is disposed substantially parallel to the front face 20X of the side portion 20S on the vehicle body width direction outside of the dash panel 20, and also encompasses configurations in which a reinforcement member is disposed to form a row from front to rear with a front face of a side portion on the vehicle body width direction outside of a dash panel, even though in such cases, the reinforcement member cannot be said to be disposed substantially parallel to a front face of a side portion on the vehicle body width direction outside of the dash panel. Moreover, the separation between the reinforcement member provided following the front face of the side portion on the vehicle body width direction outside of the dash panel, and the front face of the side portion, may be set wider or narrower than that of the reinforcement member 62 illustrated in FIG. 1 and FIG. 2.

An end portion on the vehicle body width direction outside of a reinforcement member may also be fastened to a front side portion of a rocker (24) in addition to a front pillar (50). In such a configuration, an end portion on the vehicle body width direction outside of the reinforcement member is set with a long length in the vehicle body up-down direction, thereby improving load transmission efficiency.

The above exemplary embodiment and the plural modified examples described above may be implemented in combination with each other.

Although explanation has been given regarding the example of the present exemplary embodiment, the present invention is not limited by the above, and various other modifications may be implemented within a range not departing from the spirit of the present invention.

As described above, the vehicle body front section structure of the present invention exhibits the excellent advantageous effect of enabling load acting on the dash panel to be suppressed when load is input to the front side member in a vehicle front end collision.

The invention claimed is:

1. A vehicle body front section structure comprising:
   a dash panel dividing a power unit chamber from a cabin positioned at a vehicle rear side of the power unit chamber;
   a front side member, including a portion extending in a vehicle body front-rear direction, at a side portion of the power unit chamber;
   a front pillar that is positioned further to a vehicle body width direction outer side than the front side member at a front end of a side section of the cabin, that extends in a vehicle body up-down direction, and that is joined to a vehicle body width direction outer side end portion of the dash panel; and
   a reinforcement member that is provided along a front face of a side portion on the vehicle body width direction outer side of the dash panel, and that spans between a side wall portion on the vehicle body width direction outer side of the front side member and a front wall portion at a vehicle body front side of the front pillar, wherein
   the front side member includes a side member front portion extending in the vehicle body front-rear direction at the side portion of the power unit chamber, and a side member rear portion that is contiguous to a rear end portion of the side member front portion, and that is formed with a kick portion extending toward a vehicle body rear lower side along the dash panel; and
   an upper end portion on a vehicle body width direction inner side of the reinforcement member is fixed to a side wall portion on the vehicle body width direction outer side of the side member front portion, and a lower end portion on the vehicle body width direction inner side of the reinforcement member is fixed to a side wall portion on the vehicle body width direction outer side of the kick portion.

2. The vehicle body front section structure of claim 1, further comprising:
   a rocker that is a framework member with a closed cross-section structure extending in the vehicle body front-rear direction at a lower end portion of a side section of the vehicle body,
   wherein an end portion on the vehicle body width direction outer side of the reinforcement member is fastened to a front side end portion of the rocker and to the front pillar.

3. The vehicle body front section structure of either claim 1, wherein the reinforcement member is formed with a bead extending along the vehicle body width direction as viewed from in front of the vehicle.

4. The vehicle body front section structure of claim 3, wherein the bead is set in a range including a location facing a vehicle body front side of a joining portion between the dash panel and the front pillar.

5. A vehicle body front section structure comprising:
- a dash panel dividing a power unit chamber from a cabin positioned at a vehicle rear side of the power unit chamber;
- a front side member, including a portion extending in a vehicle body front-rear direction, at a side portion of the power unit chamber;
- a front pillar that is positioned further to a vehicle body width direction outer side than the front side member at a front end of a side section of the cabin, that extends in a vehicle body up-down direction, and that is joined to a vehicle body width direction outer side end portion of the dash panel; and
- a reinforcement member that is provided along a front face of a side portion on the vehicle body width direction outer side of the dash panel, and that spans between a side wall portion on the vehicle body width direction outer side of the front side member and a front wall portion at a vehicle body front side of the front pillar, wherein:
- the front side member includes a side member front portion extending in the vehicle body front-rear direction at the side portion of the power unit chamber, and a side member rear portion that is contiguous to a rear end portion of the side member front portion, and that is formed with a kick portion extending toward a vehicle body rear lower side along the dash panel; and
- both an upper end portion and a lower end portion on a vehicle body width direction inner side of the reinforcement member are fixed to an outer wall portion on the vehicle body width direction outer side of the side member front portion.

* * * * *